United States Patent [19]

Jadatz

[11] 4,102,466
[45] Jul. 25, 1978

[54] WEATHERPROOF RECEPTACLE COVER AND SHIELD

[75] Inventor: Harald B. Jadatz, Deer Park, N.Y.

[73] Assignee: Slater Electric Co., Glen Cove, N.Y.

[21] Appl. No.: 547,708

[22] Filed: Feb. 6, 1975

[51] Int. Cl.² .............................................. H02G 3/18
[52] U.S. Cl. ...................................... 220/3.8; 174/67; 220/242
[58] Field of Search ................. 174/66, 67; 339/44 R, 339/44 M; 220/3.8, 241, 242

[56] References Cited

U.S. PATENT DOCUMENTS

| | | | |
|---|---|---|---|
| 2,728,894 | 12/1955 | Peters | 339/44 R |
| 2,880,264 | 3/1959 | Ruskin | 174/67 |
| 2,997,520 | 8/1961 | Kinsman | 220/242 X |
| 3,140,344 | 7/1964 | Slater et al. | 220/3.8 X |
| 3,200,989 | 8/1965 | Hubbell | 220/242 |
| 3,402,846 | 9/1968 | Zerwes | 220/3.8 |
| 3,439,108 | 4/1969 | Zerwes | 174/53 |
| 3,639,886 | 2/1972 | Drapkin | 220/241 X |
| 3,686,425 | 8/1972 | Zerwes et al. | 174/67 X |

*Primary Examiner*—Stephen Marcus

[57] ABSTRACT

A weatherproof cover for attachment to the open face of a vertically mounted electrical receptacle outlet box, the cover including a plate having an open faced hood extending outwardly across the top and down the opposite sides of the plate and a transparent, plastic closure having a front wall, side walls and a bottom wall pivotally mounted to the leading edge of the top hood wall and spring means at the pivotal mounting of said closure to the leading edge of the top hood wall for biasing said closure into closed position over the open face of said hood so that, when closed, said closure forms a weather cover over the electrical receptacle and, when open, said closure forms a weathershield of said receptacle.

5 Claims, 8 Drawing Figures

WEATHERPROOF RECEPTACLE COVER AND SHIELD

This invention relates to a weatherproof cover for electrical receptacles and other devices mounted in outlet boxes, more particularly, to such covers which, when closed, form a weatherproof enclosure for the receptacle and, when the cover is opened and the cord of an appliance is plugged into the receptacle, forms a weathershield over the receptacle and cord connector.

Various attempts have, heretofore, been made to provide a weatherproof cover for the electrical receptacle in an outlet box so that such box might be mounted out-of-doors, for example, on the exterior exposed wall of a house, building, mobile home, trailer, or the like. The purpose of such cover is to prevent dust, water, and other foreign materials from entering the receptacle. Protection of the receptacle from water, such as during rain storms, is of particular importance because such water can result in short circuits, fire and damage to the receptacle and the electrical system to which such receptacle is connected. While such weatherproof covers heretofore provided are effective, when closed, to protect the receptacle, when such receptacle is in use, such covers are ineffective for protecting the receptacle and the appliance cord plugged thereinto. Hence, with such receptacle, to insure safety it has been necessary to remove the appliance cord and close the cover when a rainstorm is anticipated.

In the present invention, a weatherproof cover is provided which, when the cover is closed, protects the receptacle from the elements, including rainwater, and when the receptacle is in use, provides a shield over the receptacle and the plugged in appliance cord to shield the receptacle from the elements, such as rainwater.

The cover of the instant invention includes a hood formed integral with the cover plate. The hood extends over the top and down the opposite sides of the plate and the receptacle when the plate is mounted vertically on an outlet box. A transparent closure, having front, bottom and side walls, is pivotally mounted adjacent to the outer edge of the top hood wall. The closure is spring urged into closed position. When closed, the top hood wall, the side walls of the hood and the closure and the front and bottom walls of the closure cooperate to form a weatherproof enclosure over the receptacle.

The transparent closure, in the cover of the invention, is opened by lifting the closure and pivoting the closure around the pivot on the hood. With the closure open, the male end of an appliance cord is inserted into the female receptacle and, when the cover is released, the spring bias on the closure forces the closure toward the closed position and against the cord. While the cord may prevent full closing, the front and bottom wall of the closure and the side walls of the closure with the side walls of the hood form a weathershield around the receptacle and the appliance cord plugged therein. Thus, the receptacle and the appliance cord plugged thereinto is shielded from rain driven by wind from the sides and front of the cover. In most instances, due to flexibility of convention appliance cords, the spring bias substantially closes the cover. Thus, the bottom closure wall shields the receptacle and the end of the appliance cord plugged into the receptacle from splashing water. Otherwise, such splashing water might reach the receptacle and cause a short circuit and damage.

The invention will be more fully understood from the following description and appended drawings in which FIG. 1 is a perspective view, taken from the front, showing the transparent closure of the weatherproof cover of the invention partially open;

Figure 1:
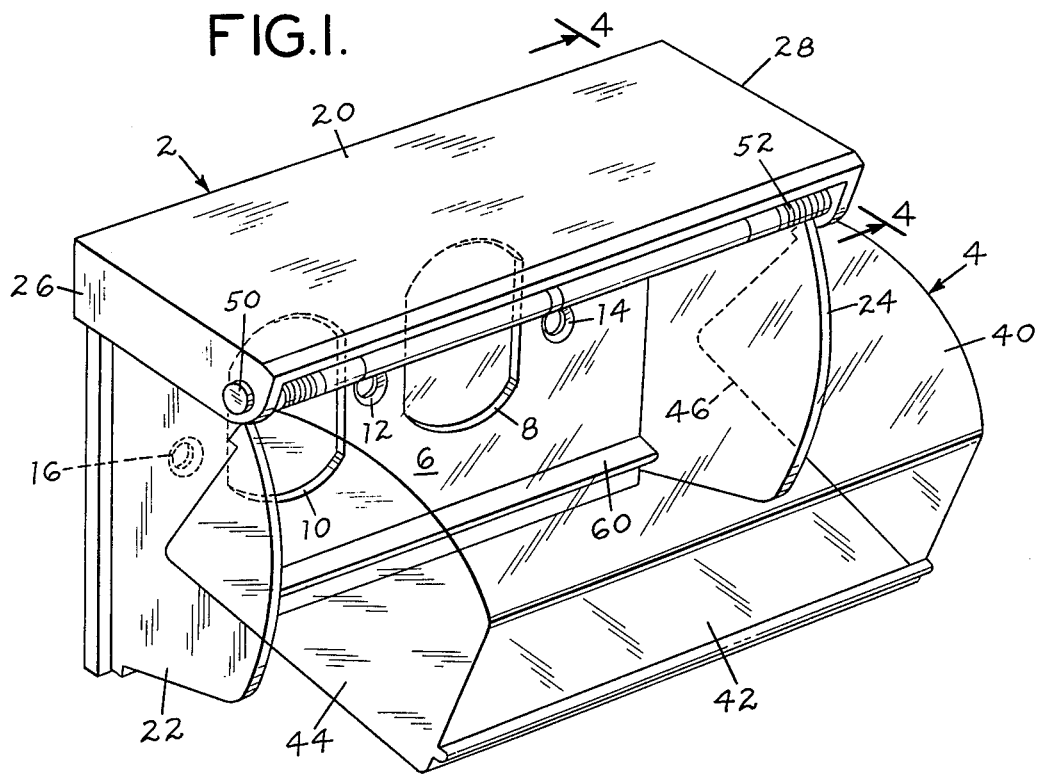
Figure 2:
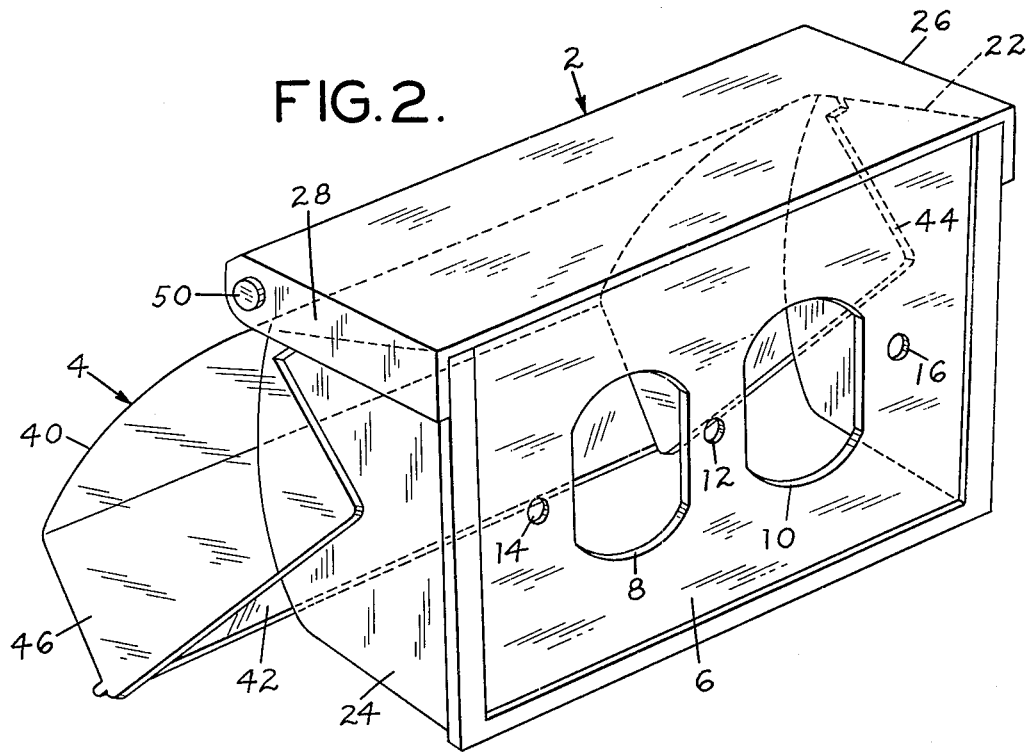
FIG. 2 is a perspective view, similar to FIG. 1, but taken from the rear.

Referring to FIGS. 1-4 of the drawings, the weatherproof cover of the instant invention includes a cover, generally designated 2, and a closure, generally designated 4. The cover 2 and closure 4 may be made of any suitable material impervious to water, dust, and the like. Preferably, cover 2 is of metal or plastic and closure 4 is of a transparent plastic.

Cover 2 includes plate 6 having round or rectangular receptacle openings 8, 10, screw opening 12 for attachment of the cover to a receptacle, not shown, and screw openings 14, 16 for attaching the weatherproof cover assembly of the instant invention to the open face of an electrical receptacle outlet box, not shown. Preferably, when attaching the weatherproof cover of the instant invention to the outlet box, a weatherproof gasket is mounted between the cover and the outlet box.

A hood, composed of a top wall 20 and side walls 22, 24, is formed integrally with plate 6 and extends outwardly from the plate in a direction away from the outlet box. At its outer ends 26, 28, hood top wall 20 extends outwardly beyond hood side walls 22, 24, for purposes more apparent hereinafter. At its leading end, outwardly from plate 6, hood wall 20 is provided with a bifurcated recess 30.

Figure 3:
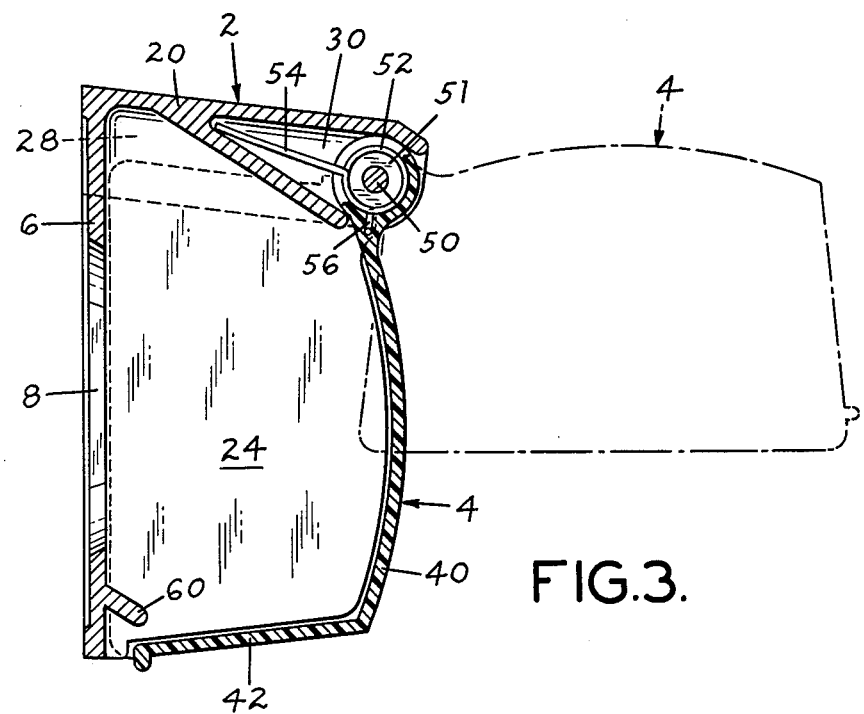
FIG. 3 is a sectional view, taken at 3—3, FIG. 1, and showing the closure in full line in closed position and, in phantom line, in open position.
Figure 4:
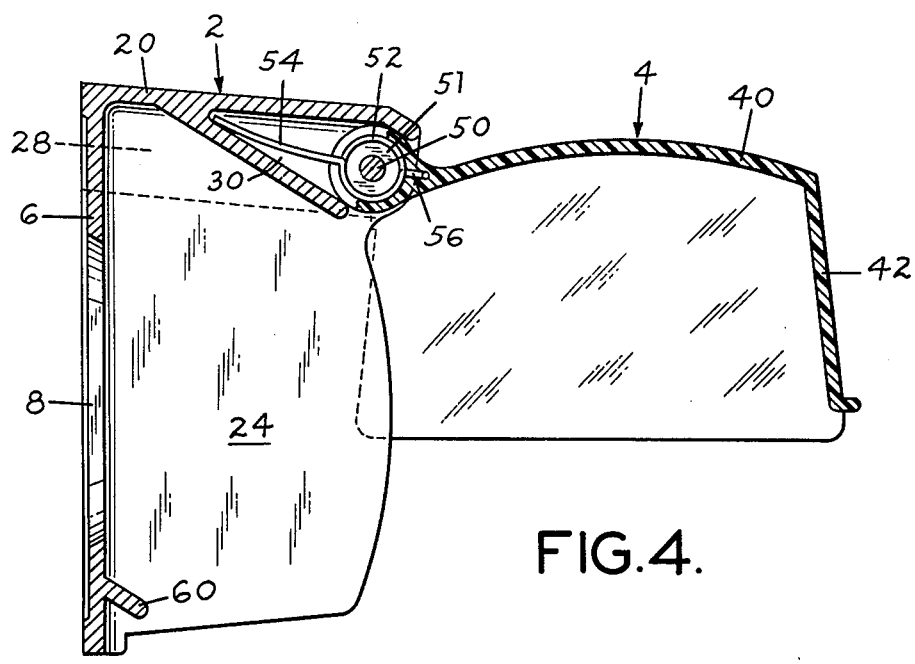
FIG. 4 is a view similar to FIG. 3 but showing the closure in full line in the open position.

Transparent closure 4 has a front wall 40, a bottom wall 42 and end walls 44, 46. Closure 4 is pivotally mounted at end walls 44, 46 adjacent the leading edge of top hood wall 20 on pins 50 extending through end walls 26, 28, respectively, of top hood wall 20 into sleeves 51, respectively, at the opposite ends of closure 4. Springs 52, mounted on sleeves 51, respectively, have outwardly extending arms 54 in bifurcated recess 30 and an arm 56 engaged in a suitable recess in closure 4. As best seen in FIGS. 3 and 4, when closure 4 is opened, FIG. 4, springs 52 are tensioned. Hence, springs 52 biases closure 4 into the closed position of FIG. 3. Adjacent the bottom edge, plate 6 is provided with a downwardly and outwardly sloping lip 60.

When assembled and mounted on a vertically disposed receptacle outlet box, closure 4 is biased into closed position by springs 52. As best shown in FIG. 3, when closure 4 is in closed position, a weatherproof cover is formed over the face of the receptacle. The clearance between closure 4 and plate 6 under lip 60, and the sloping configuration of bottom closure wall 46, when closure 4 is closed, allows condensation, if it forms within the closure, to drain out of the closure. Gap 61 between the top of transparent closure 4 and the underneath of the top of hood 20 allows air to circulate through closure 4.

When it is desired to plug the cord of an appliance into the receptacle of the embodiment of the invention as shown in FIGS. 1-4, closure 4 is lifted and pivoted around pins 50. Because closure 4 is transparent, the face of the receptacle is visible and the appliance cord may be plugged into the receptacle. After this is done and closure 4 is released, the closure is biased toward the closed position by springs 52. The end of wall 46 on closure 4, when it contacts the appliance cord, forces the cord toward the wall upon which the outlet box and the weatherproof cover of the instant invention are mounted. Thus, closure 4, while not necessarily biased into a fully closed position, forms a weatherproof shield and, substantially, a weatherproof cover over the receptacle and the plug on the appliance cord.

The embodiment of FIGS. 1-4 of the drawings is particularly adapted for use with single receptacles or where two or more receptacles are mounted horizontally, side-by-side. Where, however, two or more receptacles are mounted vertically, one above the other, the projecting length of the weatherproof closure of the instant invention may be shortened by forming such closure with two or more sections hinged together. Such modified closure, formed by two hinged sections, is shown in FIGS. 5-8.

As is shown by a comparison of the drawings of the embodiment of FIGS. 1-4 with the embodiment of the drawings of FIGS. 5-8, but for the differences in horizontal and vertical length and the hinging of the two closure sections of the embodiment of FIGS. 5-8 to each other, the cover, hood, closure and pivoted mounting of the closure adjacent the leading edge of the top hood wall in the two embodiments shown in drawings are substantially the same. Thus, the following description of the embodiment of FIGS. 5-8 is limited to the closure sections and the hinge connection of such closure section to each other.

Referring to FIGS. 5-8, upper closure section, generally designated 70, has a front wall 72 and side walls 74, 76. At its upper edge wall 72 is pivotally connected to top hood wall 20 by pins 50, 50 and springs 52, 52 in the manner described in connection with FIGS. 1-4. Springs 52, 52 urge cover 72 into closed position. At its lower edge and extending transversely thereacross, the edge of wall 72 curves outwardly and inwardly, at 78, forming a semi-cylindrical receptacle, for purposes described later herein.

Lower closure section, generally designated 80, has a front wall 82 and side walls 84, 86. At its upper edge and extending transversely thereacross, the edge of wall 82 is enlarged at 88 forming a cylindrical section seated in receptacle 78 of upper closure 70. At its opposite ends, the enlarged section 88 is provided with pins 90, 92 which are snapped into suitable recesses in upper closure end walls 74, 76. Thus, with cooperating sections 78, 88 and pins 90, 92, upper closure 70 and lower closure 80 are hinged together. Side walls 84, 86 of lower closure 80 extending upwardly into the lower ends of upper closure side walls 74, 76.

Figure 6:
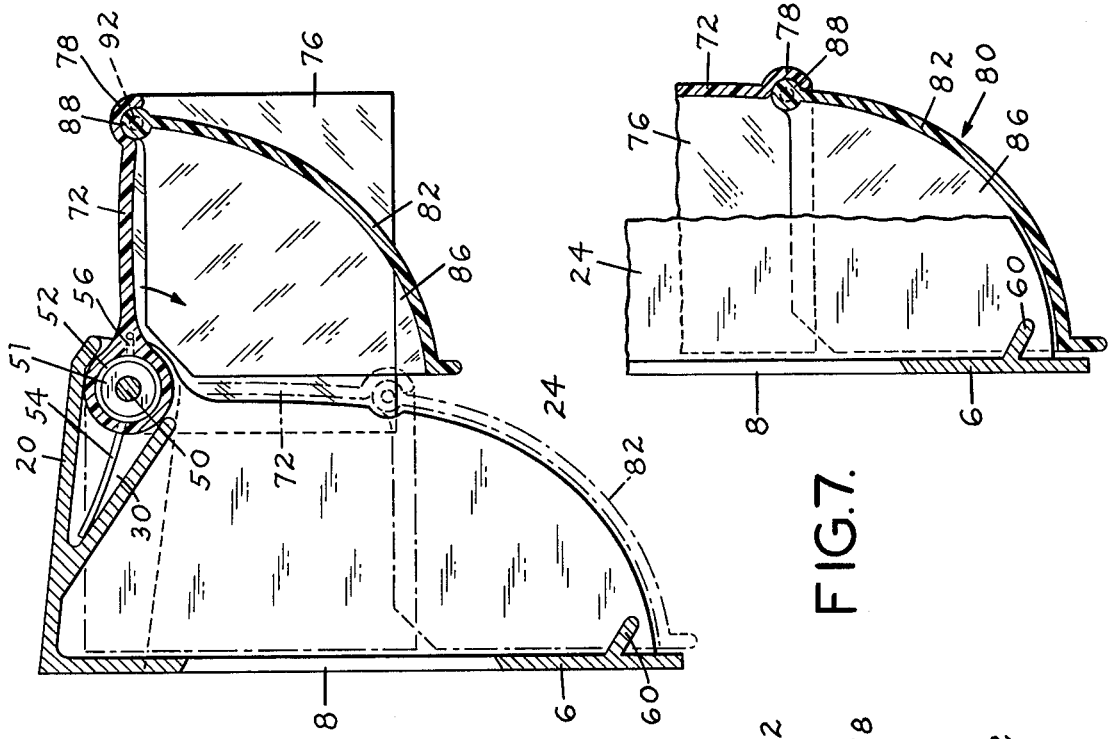
FIG. 6 is a sectional view, taken generally along the line 6—6 FIG. 5, and showing the modified closure open.
Figure 7:
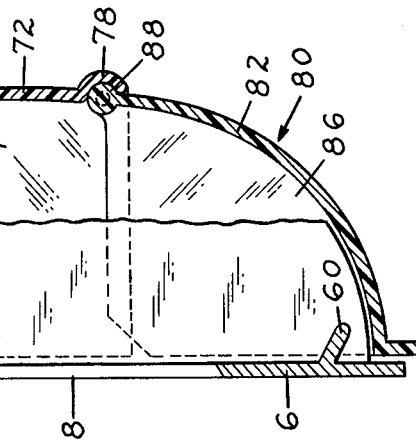
FIG. 7 is a fragmentary sectional view similar to FIG. 6 but showing the closure in closed position.
Figure 8:
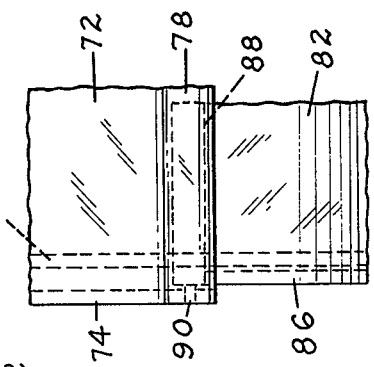
FIG. 8 is a fragmentary elevation view taken at 8—8 FIG. 5.

In the embodiment of FIGS. 5-8, as in the embodiment of FIGS. 1-4, when it is desired to plug the cord of an appliance into the receptacle of the invention, the closure is lifted and pivoted around pins 50. This may be accomplished, in the embodiment of FIGS. 5-8, by grasping side walls 84, 86 of lower closure 80 and by lifting lower closure 80 vertically upward and outward from plate 6. When so lifted, lower closure 80, through the hinge connection at 78, 88, pivots upper closure 70 about pins 50 and swings end 78 of upper closure 70 outwardly away from plate 6, as best shown in FIG. 6.

Figure 5:
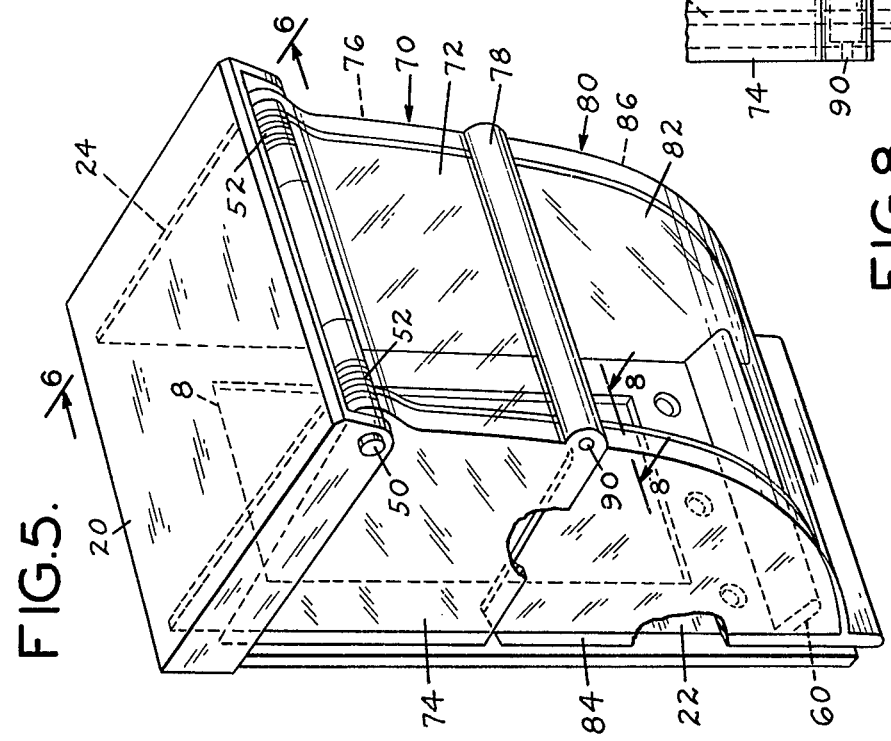
FIG. 5 is a perspective view of a modified form of the weatherproof cover of the invention and showing the modified closure closed.

With hinge connected closures 70, 80 in the open position, as shown in FIG. 6, the plug of an appliance cord can be plugged into or removed from the receptacle in plate 6. When this has been done and the closure is released, springs 52, tensioned when the closures were opened, biases closures 70, 80 into closed position. As best shown in FIG. 5, with upper and lower closures 70, 80 closed, dust, dirt, rain water, and the like are prevented from reaching receptacle in plate 6 by the over-lapping of the upper ends of the side walls of lower closure 80 with the lower ends of the side walls of upper closure 70 and by the overlapping of semi-cylindrical receptacle 78 with cylindrical section 88.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. A weatherproof cover for attachment to the open face of a vertically mounted electrical receptacle outlet box and for forming a weather enclosure therewith, said cover including a plate having at least one opening extending therethrough for receiving an electrical receptacle mounted in said box, said plate having a hood having a wall extending horizontally along the top edge and having walls extending vertically along the opposite side edges of said plate, said hood wall extending horizontally along the top edge of said plate extending outwardly and horizontally beyond the side walls of said hood, said plate having a downwardly and outwardly sloping lip extending horizontally across said plate intermediate the side walls of said hood and spaced upwardly from the bottom edge of said plate, and a closure mounted adjacent the leading edge of the hood for pivoted movement along a line spaced inwardly and below the outward leading edge of said top edge hood wall, said closure having a front wall, a bottom wall and side walls at the opposite ends of said front and bottom walls, said closure walls and the hood walls extending horizontally along the top edge and vertically along the opposite side edges of said plate and forming a weather enclosure for the electrical receptacle when said closure is in closed position and a weathershield for the electrical receptacle when said closure is in open position and means for spring biasing said closure on said pivoted axis into closed position.

2. A weatherproof cover, as recited in claim 1, in which said closure is of a transparent, plastic material.

3. A weatherproof cover for attachment to the open face of a vertically mounted electrical receptacle outlet box and for forming a weather enclosure therewith, said cover including a plate having at least one opening extending therethrough for receiving an electrical receptacle mounted in said box, said plate having a hood having a wall extending horizontally along the top edge and having walls extending vertically along the opposite side edges of said plate, said hood walls extending outwardly from said plate and forming a continuous fixed weathershield over the top and along the sides of said electrical receptacle opening, the front and bottom of said fixed weathershield being open, and a closure, said closure having hingedly interconnected upper and lower sections, said sections having a front wall and side walls at the opposite ends of said front wall, said lower section having a bottom wall, said closure being mounted at the upper edge of the front wall of said upper section to the leading edge of the hood for pivoted movement along an axis parallel to the top edge of said plate, the upper edge of the front wall of said lower section being hingedly interconnected to the lower edge of the front wall of said upper section for pivotal movement along an axis parallel to said top edge of said plate and parallel to said upper edge of said front wall of said upper section, said closure walls and the hood walls extending horizontally along the top edge and vertically along the opposite side edges of said plate and forming a weather enclosure for the electrical receptacle when said closure is in closed position and a weathershield for the electrical receptacle when said closure is in open position.

4. A weatherproof cover, as recited in claim 3, in which said closure is spring biased at said mounting at the upper edge of said front wall into closed position.

5. A weatherproof cover, as recited in claim 4, in which said upper and lower closure sections are of a transparent, plastic material.

* * * * *